US00RE40745E

(19) United States
(12) Reissued Patent
Nire

(10) Patent Number: US RE40,745 E
(45) Date of Reissued Patent: Jun. 16, 2009

(54) COMMAND PROCESSING METHOD AND RADIO COMMUNICATION APPARATUS

(75) Inventor: Katsuo Nire, Saitama (JP)

(73) Assignee: Sony Corporation, Tokyo (JP)

(21) Appl. No.: 12/079,410

(22) Filed: Mar. 26, 2008

Related U.S. Patent Documents

Reissue of:
(64) Patent No.: 7,020,117
Issued: Mar. 28, 2006
Appl. No.: 09/955,339
Filed: Sep. 17, 2001

(30) Foreign Application Priority Data

Sep. 19, 2000 (JP) ..... 2002-283847

(51) Int. Cl.
*H04Q 7/24* (2006.01)

(52) U.S. Cl. ..... 370/338; 370/462; 370/401; 370/351; 370/328

(58) Field of Classification Search ..... 370/328, 370/338, 310, 349, 401, 410, 351–356
See application file for complete search history.

(56) References Cited

U.S. PATENT DOCUMENTS

| | | | |
|---|---|---|---|
| 5,101,499 | A | 3/1992 | Streck et al. |
| 5,410,326 | A | 4/1995 | Goldstein |
| 5,410,343 | A | 4/1995 | Coddington et al. |

(Continued)

FOREIGN PATENT DOCUMENTS

| | | |
|---|---|---|
| CN | 1249644 | 4/2000 |
| DE | 196 28 540 | 1/1998 |
| DE | 200 00 450 | 3/2000 |

(Continued)

OTHER PUBLICATIONS

Vazquez–Cortizo D et al; "FS–aloha, a collision resolution algorithm with Qos support for the contention channel in multiservices, wireless Lan" Global Communication Conference (Globecom 99), vol. 5.5 Dec. 1999 (Dec. 5, 1999), pp. 2773–2777, XPO10373453.

"Wireless Medium Access Control (MAC) and Physical (PHY) Specifications" IEEE Standard 802.11–1997, XX, XX, 1997, pp. 71–99, XP002927753.

Gang Wu et al.: "WINMAC: a novel transmission protocol for infostations" Vehicular Technology Conference, 1999 IEEE 49th Houston, Tx, USA, 16–20 May 1999, Piscataway, NJ, USA, IEEE, US, May 16, 1999 (19999–05–16), pp. 1340–1344, x–010342188, ISBN: 0–7803–5565–2.

(Continued)

*Primary Examiner*—Andrew C. Lee
(74) *Attorney, Agent, or Firm*—Frommer Lawrence & Haug LLP; William S. Frommer

(57) ABSTRACT

A command processing method for a radio LAN system composed of a plurality of terminals and at least one base apparatus is disclosed which prevents users of the terminals from suffering from confusion or conflict between them with regard to handling of a command issued from any of the terminals and from misunderstanding that the system has failed. When a channel changing command or a like command is issued from a terminal, the base apparatus determines whether or not the received command is a competitive command whose acceptance may result in the disturbance of reception of data of any other terminal. If the received command is a competitive command, then the base apparatus rejects the command and issues a notification of the rejection to the terminal which has issued the command. When a particular condition is satisfied such as when the priority of the terminal which has issued the command is higher than that of any other terminal receiving data, then the base apparatus may accept the command.

15 Claims, 7 Drawing Sheets

U.S. PATENT DOCUMENTS

| | | | | | |
|---|---|---|---|---|---|
| 5,467,341 | A | | 11/1995 | Matsukane et al. | |
| 5,537,414 | A | * | 7/1996 | Takiyasu et al. | 370/347 |
| 5,802,467 | A | | 9/1998 | Salazar et al. | |
| 5,862,339 | A | | 1/1999 | Bonnaure et al. | |
| 5,896,131 | A | | 4/1999 | Alexander | |
| 5,917,810 | A | | 6/1999 | De Bot | |
| 5,920,701 | A | | 7/1999 | Miller et al. | |
| 5,933,141 | A | | 8/1999 | Smith | |
| 5,949,432 | A | | 9/1999 | Gough et al. | |
| 6,012,088 | A | | 1/2000 | Li et al. | |
| 6,028,600 | A | | 2/2000 | Rosin et al. | |
| 6,037,998 | A | | 3/2000 | Usui et al. | |
| 6,097,441 | A | | 8/2000 | Allport | |
| 6,226,277 | B1 | * | 5/2001 | Chuah | 370/328 |
| 6,263,503 | B1 | | 7/2001 | Margulis | |
| 6,282,577 | B1 | * | 8/2001 | Okanoue et al. | 709/250 |
| 6,396,523 | B1 | | 5/2002 | Segal et al. | |
| 6,404,772 | B1 | * | 6/2002 | Beach et al. | 370/443 |
| 6,417,869 | B1 | | 7/2002 | Do | |
| 6,469,633 | B1 | | 10/2002 | Wachter | |
| 6,542,295 | B2 | * | 4/2003 | Boys et al. | 359/410 |
| 6,546,425 | B1 | * | 4/2003 | Hanson et al. | 709/227 |
| 6,670,970 | B1 | | 12/2003 | Bonura et al. | |
| 6,879,579 | B1 | * | 4/2005 | Myles et al. | 370/348 |

FOREIGN PATENT DOCUMENTS

| | | |
|---|---|---|
| EP | 0 477 754 | 4/1992 |
| EP | 0 537 814 | 4/1993 |
| EP | 0 617 556 | 9/1994 |
| EP | 0 793 170 | 9/1997 |
| EP | 0 838 945 | 4/1998 |
| EP | 0 848 560 | 6/1998 |
| EP | 0 942 572 | 9/1999 |
| EP | 0 967 797 | 12/1999 |
| EP | 1 001 627 | 5/2000 |
| EP | 1 011 257 | 6/2000 |
| GB | BG 2 343 334 | 5/2000 |
| WO | WO 95 34168 | 12/1995 |
| WO | WO 98 59282 | 12/1998 |
| WO | WO 99 34599 | 7/1999 |
| WO | WO 00 02351 | 1/2000 |
| WO | WO 00 14919 | 3/2000 |
| WO | WO 01 35551 | 5/2001 |
| WO | WO 01 35585 | 5/2001 |

OTHER PUBLICATIONS

Truman T E et al. : "The Infopad Multimedia Terminal: A Portable Device for Wireless Information Access" IEEE Transactions on Computers, IEEE Inc, New York, US, vol. 47, No. 10, Oct. 1, 1998, pp. 1073–1087, XP000781992, ISSN: 0018–9340.

Patent Abstracts of Japan vol. 1998. No. 14, Dec. 31, 1998 & JP 10 257401 A (Access:KK) Sep. 25, 1998.

Patent Abstracts of Japan, 2001–177478 dated Jun. 29, 2001.

* cited by examiner

COMMAND PROCESSING METHOD AND RADIO COMMUNICATION APPARATUS

Matter enclosed in heavy brackets [ ] appears in the original patent but forms no part of this reissue specification; matter printed in italics indicates the additions made by reissue.

BACKGROUND OF THE INVENTION

This invention relates generally to a command processing method for a radio LAN (Local Area Network) system, and a radio communication apparatus which composes a radio LAN system.

In order to view an audio/video program, access the Internet, or perform various other desired functions with a computer it is conventionally necessary to maintain at least one hard-wired connection so that desired data may be transferred from any number of remote sites to the computer for processing, and then to an associated display device for display. It would therefore be beneficial to provide an improved device allowing for access to the above functions without maintaining such a hard-wired connection.

SUMMARY OF THE INVENTION

Therefore, generally speaking, in accordance with the invention, an improved display terminal for a radio LAN system is provided.

In accordance with the invention, it has been proposed to construct a radio LAN system from a plurality of apparatus and transmit and receive data between the apparatus in a limited area such as within a house or within a room. To this end, the IEEE (Institute of Electrical and Electronics Engineers) 802.11 standards prescribe a 2.4 GHz and 5 GHz radio frequency bands that can be used for such a radio LAN system.

A radio LAN system of the type described includes, for example, a base apparatus and one or more terminals. The base apparatus includes a built-in tuner or a tuner connected thereto for receiving a broadcast and to which a telephone circuit or the like is connected. A terminal that communicates with the base apparatus by radio communication to send a command or other information to the base apparatus and receive information such as image data and audio data from the base apparatus to allow for the display of an image on a display section and the output sound from a speaker or an earphone is also provided. Thus, a user of such a radio LAN system can enjoy a ground wave TV (television) broadcast or a BS/CS (broadcasting satellite/communications satellite) digital broadcast, access the Internet, or enjoy telephone conversation using the display terminal regardless of the location of the user in a house or in a room.

In particular, a radio LAN system can be configured as is shown in FIG. 1. The radio LAN system shown in FIG. 1 includes two terminals 30A and 30B each including an antenna 31, a liquid crystal display (LCD) apparatus 32, a speaker 33 and a microphone 34. A base apparatus 10 is also shown, and includes an antenna 11 for radio communication with terminals 30A and 30B and a built-in TV tuner 13 connected to an antenna 12 for reception of a TV broadcast. A telephone circuit 1 is also connected to base unit 10. In accordance with the radio LAN system of the invention, a user can use terminal 30A in a first location while another user can use terminal 30B in a second location to enjoy a TV broadcast, access the Internet or enjoy telephone conversation.

In the radio LAN system in accordance with the invention including two terminals 30A and 30B, for example, when a TV broadcast is to be enjoyed by a user, if only one of the terminals is in use and receives the broadcast, then the user can freely change the channel. However, when both of terminals 30A and 30B are in use and receive the broadcast simultaneously, a problem arises with regard to channel selection.

If the system is configured such that the channel to be received by the TV tuner 13 in base apparatus 10 is changed by base apparatus 10 each time a channel changing command is issued from one of the terminals, then each time a channel changing command is issued from any of the terminals, the broadcast channel to be received by the terminals 30A and 30B is changed for both terminals. As a result, confusion or conflict in channel selection occurs between the user of terminal 30A and the user of terminal 30B.

While terminals 30A and 30B receive the same broadcast channel X simultaneously, if a command for changing the channel to a channel Y is issued from terminal 30A and another command for changing the channel to a channel Z is issued immediately or substantially simultaneously from terminal 30B, then the channel is changed to channel Z (the second requested channel) on both of terminals 30A and 30B. Consequently, the user of the terminal 30A who has requested the channel selection to channel Y may assume that the system has failed.

In accordance with the invention, an improved command processing method and radio communication apparatus for a radio LAN system is provided composed of a plurality of terminals and at least one base apparatus which prevents users of the terminals from suffering confusion or conflict between them when issuing command from the terminals.

According to an aspect of the present invention, there is provided a method for processing commands for a radio LAN system that includes a plurality of terminals and at least one base apparatus. In the system, commands issued from any of the terminals are received by the base apparatus. Information is transmitted from the base apparatus to the terminals by radio communication. The base apparatus first receives a command issued from any of the terminals. The base apparatus then determines whether or not the received command is a competitive command whose acceptance may result in the disturbance of any other terminal that is receiving information. If it is determined that the received command is a competitive command, the command is rejected. A notification of the rejection to the terminal which has transmitted the command is issued.

The command processing method includes an alternative embodiment including the feature that a priority order among the terminals may be set. Thus, even if a received command is a competitive command, if the priority of the terminal which has transmitted the command is higher than that of any of the other terminals that is currently receiving information, then the base apparatus accepts the command and issues a notification of the acceptance of the command to the other terminal or terminals.

In another alternative embodiment, a command processing method may be constructed such that, even if a competitive command is received, if a predetermined time or more has elapsed after implementation of a previous command regarding a process being currently executed by any other terminal, then the base apparatus accepts the command and issues a notification of the acceptance of the command to the other terminals that are a receiving state.

In accordance with another alternative embodiment of the invention, a command processing method may be constructed such that, if a competitive command is received, then the base apparatus issues to the other terminals that are receiving information an inquiry whether the command may be accepted. If a reply from the other terminals accepts the command, the command is then accepted by the base unit.

According to another aspect of the invention, a radio communication apparatus for a radio LAN system is provided that includes a plurality of terminals and at least one base apparatus. A command issued from any of the terminals is received by the base apparatus and information is transmitted from the base apparatus to the terminals by radio communication. The radio communication apparatus is located in the base apparatus. The radio communication apparatus comprises a receiver for receiving a command issued from any of the terminals, and a discriminator for determining, when a command issued from any of the terminals is received by the reception means, whether the command is a competitive command whose acceptance may result in disturbance of the reception of information by any other of the terminals. Based upon a result of the determination, it is determined whether or not the command should be accepted. Finally, when it is determined that acceptance of the command should be rejected, a notification of the rejection of the command is transmitted to the terminal which transmitted the command.

In the command processing method and the radio communication apparatus in accordance with the invention, if a competitive command is issued from a terminal, it is generally not accepted by the base apparatus. Therefore no disturbance or conflict occurs among the users of the terminals in regard to handling of a command issued from one of the terminals. If the command is not accepted, then a notification of such a rejection is issued from the base apparatus to the terminal which originally transmitted the command. Therefore, if the command is not accepted, the user of the terminal which has issued the command does not think that the system has failed.

Still other objects and advantages of the invention will in part be obvious and will in part be apparent from the specification and the drawings.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

DETAILED DESCRIPTION OF THE PREFERRED EMBODIMENT

Figure 1:
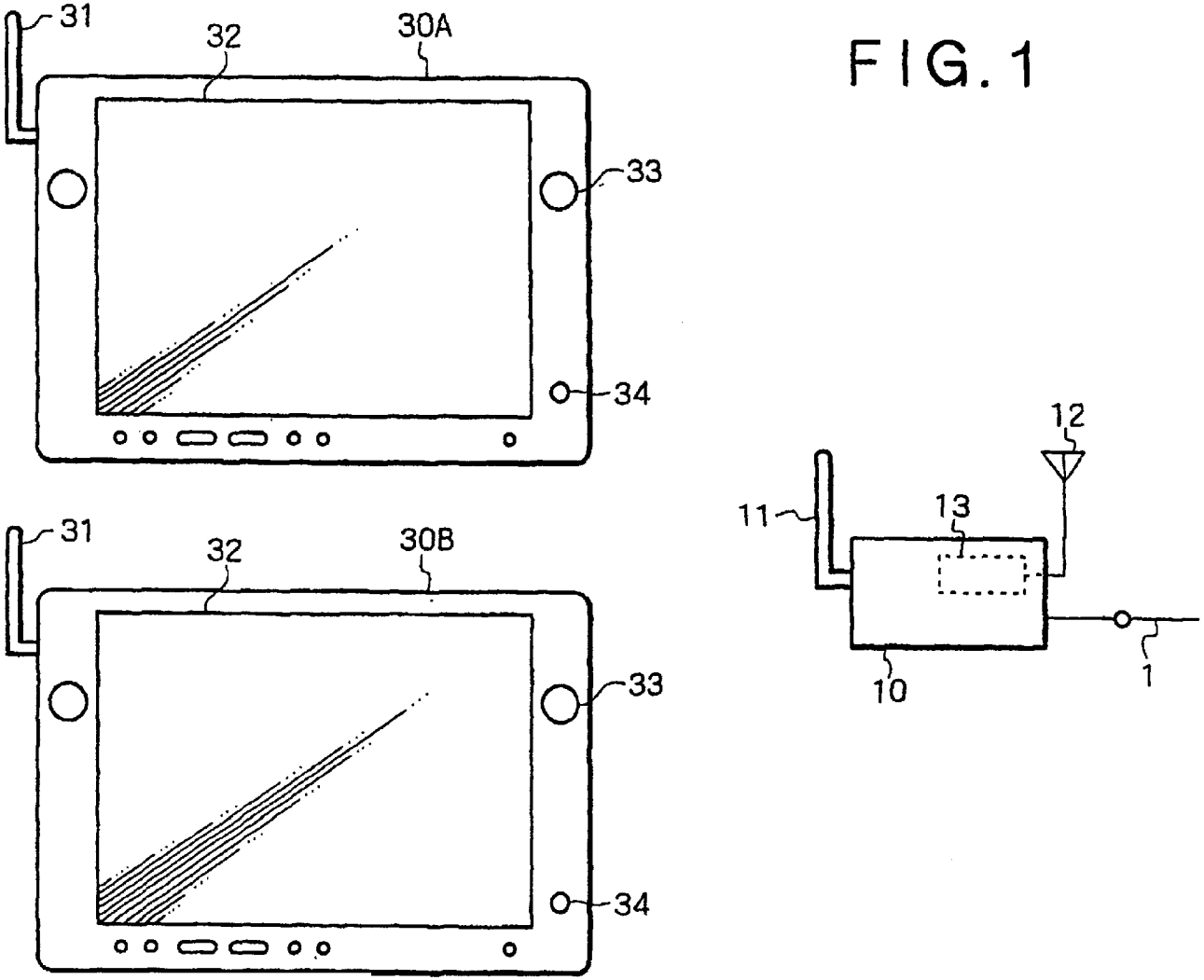
FIG. 1 is a schematic view showing an example of radio LAN system.
Figure 2:
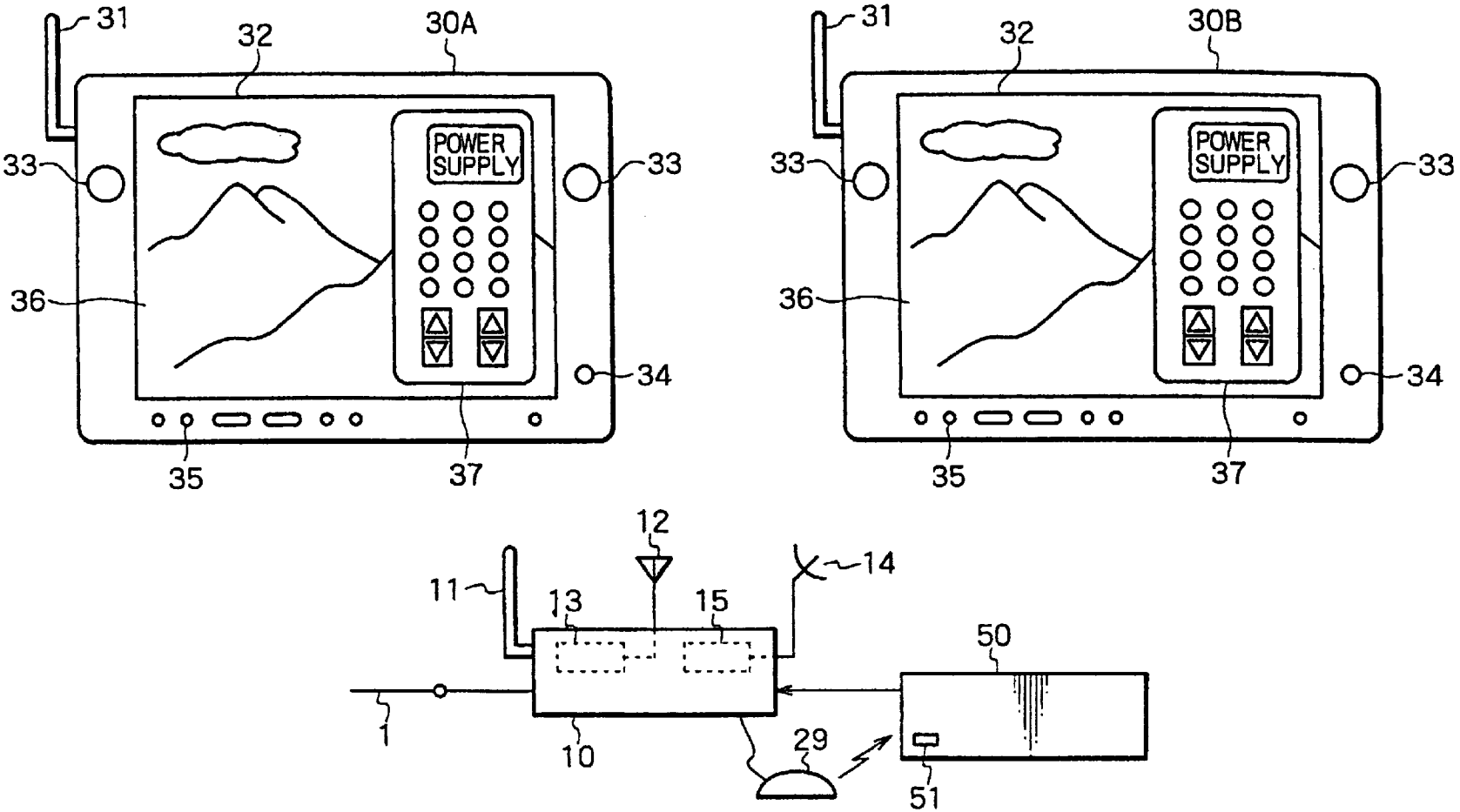
FIG. 2 is a schematic view showing an example of a radio LAN system to which a command processing method according to an embodiment of the invention is applied.

FIG. 2 shows an example of radio LAN system to which a command processing method according to the present invention can be applied. Referring to FIG. 2, the radio LAN system shown includes a base apparatus 10 and two display terminals 30A and 30B.

A telephone circuit 1 is connected to base apparatus 10. Base apparatus 10 includes an antenna 11 for radio communication with display terminals 30A and 30B so that display terminals 30A and 30B are able to perform telephone communication as desired utilizing radio communication with base apparatus 10 (as will be described below) and access the Internet. Of course, any manner for accessing the Internet may be employed by display terminals 30A and 30B, as long as this method of access is properly connected to base unit 10.

Further, an antenna 12 for receiving a ground wave television broadcast and another antenna 14 for receiving a BS/CS digital broadcast are connected to the base apparatus 10. A tuner 13 and a BS/CS tuner 15 are built into base apparatus 10 so that display terminals 30A and 30B can receive video and audio information of a ground wave television broadcast and a BS/CS digital through radio communication with base apparatus 10. Of course, rather than an antenna, a cable feed wire or other transmission media for a television broadcast may be coupled with base apparatus 10. In accordance with such a configuration, tuners 13 and 15 would be configured to allow a user to select from among various audio/video programs provided via the provided transmission media.

Furthermore, a playback apparatus such as a DVD player may be connected as an external apparatus 50 so that the display terminals 30A and 30B can receive audio/video program information and so forth played back by external apparatus 50 through radio communication with base apparatus 10. While a DVD player is shown, any appropriate playback device may be employed.

A remote controller transmitter 29 such as a remote controller mouse or the like is connected to base apparatus 10. An infrared remote control signal transmitted from remote controller transmitter 29 is received by a remote control signal reception section 51 provided on external apparatus 50 to control external apparatus 50. Of course other control devices, such as a radio wave remote control, or hardwired controller may be provided for allowing control of external apparatus 50.

Display terminals 30A and 30B (collectively "display terminal 30") will now be described. Display terminal 30 includes an antenna 31 for radio communication with base apparatus 10, a liquid crystal display (LCD) apparatus 32 for displaying an image, a speaker 33 for outputting sound, and a microphone 34 for inputting sound. Display terminal 30 further includes a key selection and operation section 35 including a power supply key, an Internet key, an electronic mail key, a channel selection key, a sound volume adjustment key and the like.

Further, a touch panel 36 is provided on a screen of LCD apparatus 32 so that, when a user touches touch panel 36 within a predetermined region, a control panel 37 is displayed on LCD apparatus 32. A user can touch a key switch section of control panel 37 to control various functions of base apparatus 10, such as requesting a channel change.

Figure 3:
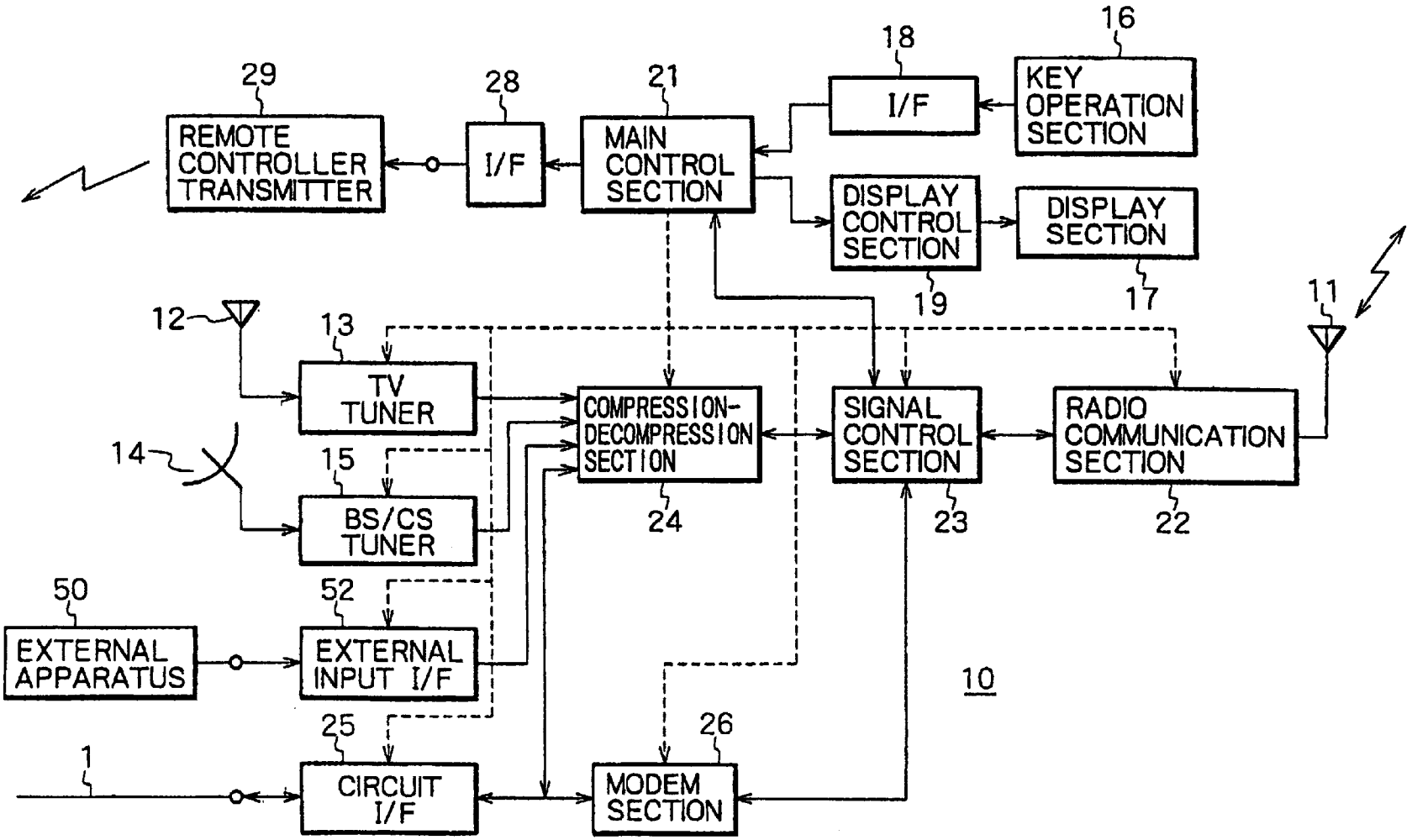
FIG. 3 is a block diagram showing an example of functional block configuration of a base apparatus of the radio LAN system of FIG. 2.
Figure 4:
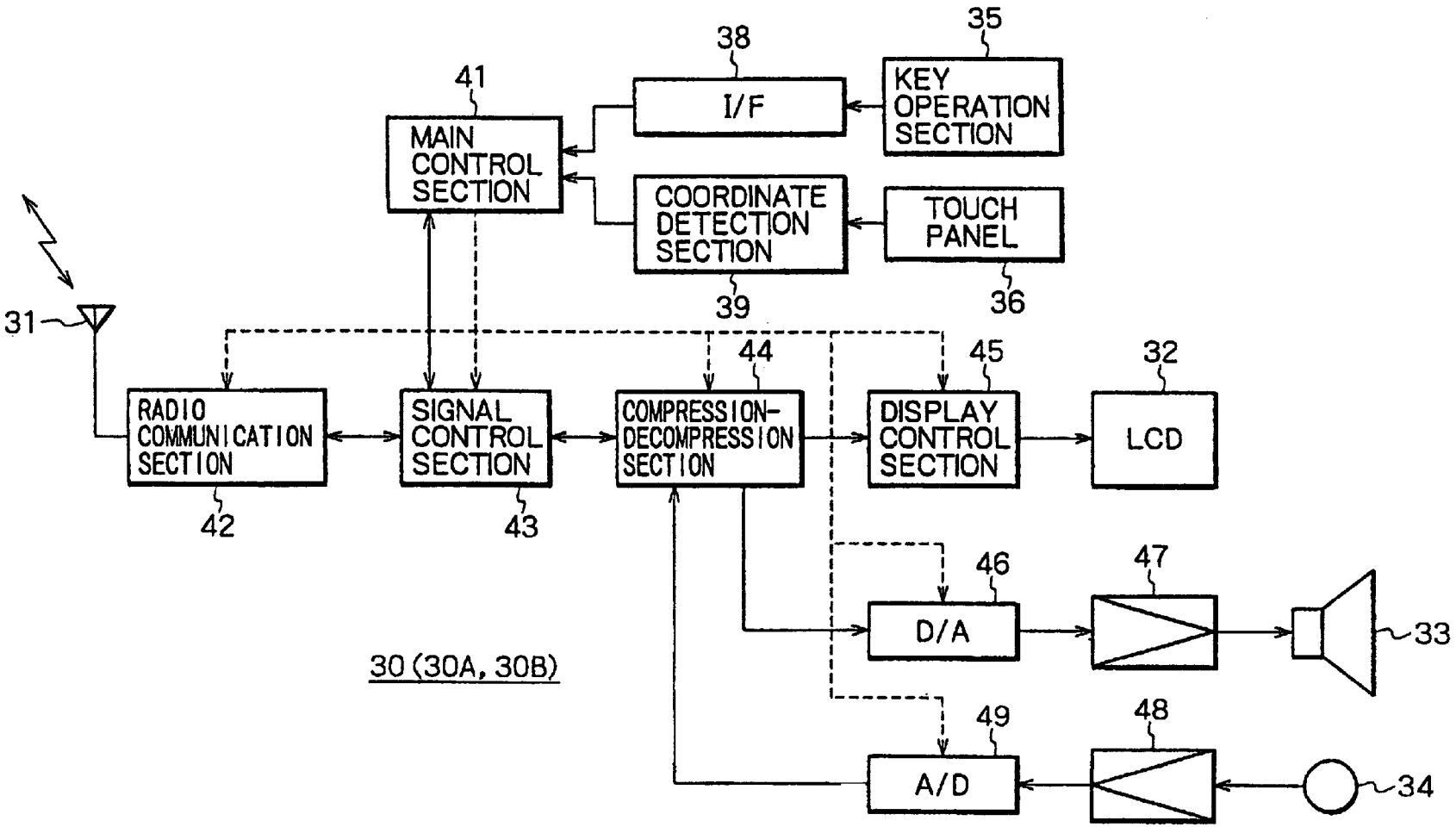
FIG. 4 is a block diagram showing an example of functional block configuration of terminals of the radio LAN system of FIG. 2.

Base apparatus 10 is functionally configured as shown in FIG. 3 while display terminal 30 is functionally configured as shown in FIG. 4, as will now be described.

Referring next to FIG. 3, base apparatus 10 includes a key operation section 16 and a display section 17 which function as a user interface between the user and base apparatus 10. Key operation section 16 is connected to a main control section 21 through an interface section 18. Display section 17 is connected to main control section 21 through a display control section 19. Remote controller transmitter 29 is connected to main control section 21 through an interface section 28.

A signal of a ground wave television broadcast selected and demodulated, and then converted into digital image data by tuner 13 from a data signal received by antenna 12, and is then sent to a compression-decompression section 24. A signal of a BS/CS digital broadcast is selected and separated into compressed image data and compressed audio data. The separated data are then decompressed by BS/CS tuner 15, and are sent to compression-decompression section 24. Telephone circuit 1 is connected to compression-decompression section 24 through a circuit interface section 25 and is also connected to a signal control section 23 through a modem section 26.

Furthermore, external apparatus 50 reproduces and outputs data to compression-decompression section 24, via external input interface 52.

Compression-decompression section 24 compresses video data and audio data from TV tuner 13, BS/CS tuner 15, external input interface 52 and circuit interface section 25 in accordance with a predetermined compression system such as, for example, the MPEG (Moving Picture Experts Group) system. The compressed video data and audio data are forwarded to signal control section 23.

Further, compression-decompression section 24 decompresses compressed audio data transmitted thereto from display terminal 30. This compressed audio data is received by a radio communication section 22 and then forwarded from radio communication section 22 to compression-decompression section 24 through signal control section 23. The decompressed audio signal data is then forwarded to circuit interface section 25.

Radio communication section 22 modulates data forwarded from signal control section 23 in accordance with a predetermined modulation system such as, for example, the CCK (Complementary Code Keying) system or the OFDM (Orthogonal Frequency Division Multiplexing) system, for example. The modulated data is then converted into a high frequency signal in the 2.4 GHz band or the 5 GHz band. The high frequency signal is then transmitted from antenna 11 to display terminal 30. Radio communication section 22 also converts a high frequency signal transmitted thereto from display terminal 30 and received by antenna 11 into an intermediate frequency signal, demodulates the intermediate frequency signal and forwards the demodulated data to signal control section 23.

Signal control section 23 arbitrates and selectively forwards video data and audio data compressed by compression-decompression section 24, data received by modem section 26 and control data from main control section 21 to radio communication section 22. Further, signal control section 23 selectively forwards data transmitted from display terminal 30 and received by radio communication section 22. This received data is then forwarded from radio communication section 22 to signal control section 23, and from signal control section 23 to main control section 21, modem section 26 and compression-decompression section 24.

Main control section 21 controls the components of base apparatus 10. Main control section 21 comprises, though not shown in FIG. 3, a CPU (Central Processing Unit), a ROM (Read Only Memory) in which programs to be executed by the CPU, fixed data and so forth are written, a RAM (Random Access Memory) which functions as a working area of the CPU and other necessary elements.

Referring next to FIG. 4, display terminal 30 constructed in accordance with the invention includes a main control section 41 to which key operation section 35 is connected through an interface section 38. Further, a coordinate detection section 39 is provided as an interface for touch panel 36 and detects coordinates of a touched position of touch panel 36. The detected coordinate values are forwarded to main control section 41.

If touch panel 36 is touched in the predetermined region thereof, then main control section 41 controls a display control section 45 to display control panel 37 on LCD apparatus 32. Then, if the key switch section of control panel 37 displayed on the LCD apparatus 32 is touched, main control section 41 produces control data in response to the touched position of the key switch section. Further, if key operation section 35 is operated, main control section 41 produces control data in response to the operated key. The control data produced by main control section 41 is forwarded to a signal control section 43.

In display terminal 30, an audio signal from microphone 34 is amplified by an audio amplifier 48 and converted into digital audio data by an A/D (analog to digital) converter 49. The audio data is compressed in accordance with a predetermined compression system by a compression-decompression section 44. The compressed audio data is then forwarded to signal control section 43.

Signal control section 43 arbitrates and selectively forwards control data from main control section 41 and audio data compressed by compression-decompression section 44 to a radio communication section 42. Further, signal control section 43 selectively forwards data transmitted from base apparatus 10 and received by radio communication section 42. Control and other data that are previously received by modem section 26 of base apparatus 10 are forwarded to main control section 41, while compressed video data and audio data are forwarded to compression-decompression section 44.

Radio communication section 42 modulates data forwarded from signal control section 43 in accordance with a predetermined modulation system, converts the modulated data into a high frequency signal in the 2.4 GHz band or the 5 GHz band and transmits the high frequency signal from antenna 31 to base apparatus 10. Further, radio communication section 42 converts a high frequency signal transmitted from base apparatus 10 and received by antenna 31 into an intermediate frequency signal, demodulates the intermediate frequency signal and forwards the demodulated data to signal control section 43.

Compression-decompression section 44 decompresses compressed video data and audio data forwarded from signal control section 43. The decompressed video data is displayed as an image on LCD apparatus 32 under the control of display control section 45. The decompressed audio data is converted into an analog audio signal by a D/A (digital to analog) converter 46, is amplified by an audio amplifier 47 and is output as sound from speaker 33.

Main control section 41 controls the components of display terminal 30 and includes, though not shown in FIG. 4, a CPU, a ROM, a RAM and so forth similarly to main control section 21 of base apparatus 10.

In order to receive a ground wave television broadcast or a BS/CS digital broadcast at display terminal 30 in the radio LAN system described above, video data and audio data from TV tuner 13 or BS/CS tuner 15 of base unit 10 from a selected channel are first compressed by compression-decompression section 24. This compressed data is then transmitted by radio communication section 22 under the control of signal control section 23 to display terminal 30. In display terminal 30, the compressed video data and audio data are first received by radio communication section 42. This received data is then forwarded to and decompressed by compression-decompression section 44 under the control of signal control section 43. Consequently, an image is displayed on LCD apparatus 32 and sound is output from speaker 33.

If a user selects a channel of a TV or BS/CS broadcast using key operation section 35 or control panel 37, a command indicating the desired channel is transmitted from main control section 41 of display terminal 30 to the base apparatus 10 by radio communication section 42 under the control of signal control section 43.

In base apparatus 10, the transmitted command is received by radio communication section 22 and sent to main control section 21 under the control of signal control section 23. Main control section 21 controls tuner 13 to select a channel in accordance with the received command.

In order to view and hear data played back by external apparatus 50, the user initiates a playback operation through key operation section 35 or control panel 37. In response, a command is transmitted from terminal 30 to base apparatus 10 requesting playback of data by external apparatus 50.

External apparatus 50 is controlled in accordance with a command transmitted by remote controller 29. Desired image and audio data are therefore played back by external apparatus 50. Image and audio data output from external apparatus 50 are transmitted from base apparatus 10 to terminal 30 in a manner similar to that noted above. At terminal 30 an image is displayed on LCD 32 and sound is output from speaker 33 in accordance with the received image data and audio data, respectively.

In order to access the Internet, a user operates key operation section 35 or control panel 37 to request connection to an ISP (Internet Service Provider). The request is transmitted from main control section 41 of display terminal 30 to base apparatus 10 by radio communication section 42 under the control of signal control section 43.

In base apparatus 10, a request is received by radio communication section 22 and is forwarded to main control section 21 under the control of signal control section 23. Consequently, modem section 26 and circuit interface section 25 are controlled in response to the request by main control section 21 to establish a connection to the ISP. Then, for example, data sent from the ISP to telephone circuit 1 in response to the access request to a certain homepage is sent to signal control section 23 through circuit interface section 25 and the modem section 26. This data is in turn transmitted to display terminal 30 by radio communication section 22.

In display terminal 30, the data is received by the radio communication section 42 and sent to main control section 41 under the control of signal control section 43. Main control section 41 processes the data to produce display data. This display data is then forwarded to display control section 45 so that the retrieved homepage is displayed on the LCD apparatus 32. Of course, access to the Internet may be performed employing any other type of provided ISP connection, including but not limited to cable transmissions, satellite transmissions, DSL transmissions, or any other information data transmission medium.

In order to perform the function of allowing for a telephone conversation, a transmission audio signal from microphone 34 of display terminal 30 is converted into digital audio data by A/D converter 49 and compressed by compression-decompression section 44. Then, the compressed audio data is transmitted to base apparatus 10 by radio communication section 42 under the control of the signal control section 43.

In base apparatus 10, the compressed audio data is received by radio communication section 22. This received data is in turn forwarded to and decompressed by compression-decompression section 24 under the control of signal control section 23. Then, the decompressed transmission audio signal is forwarded to telephone circuit 1 through circuit interface section 25.

Meanwhile, a received audio signal transmitted over telephone circuit 1 is sent through circuit interface section 25 to compression-decompression section 24 where it is compressed. The compressed audio data is transmitted to display terminal 30 by radio communication section 22 under the control of signal control section 23.

In display terminal 30, the compressed audio data is received by radio communication section 42. This received audio data is forwarded to and decompressed by compression-decompression section 44 under the control of signal control section 43. Then, the decompressed audio data is converted into an analog audio signal by D/A converter 46 and output as a voice from speaker 33.

Different forms of command processing methods according to the invention will now be described. A command issued from the terminal 30A or 30B is processed by the base apparatus 10 in the radio LAN system described hereinabove.

According to the command processing method of the present invention, if a command issued from terminal 30A or 30B is a competitive command, then the base apparatus 10 does not accept the command. A competitive command is one that would disturb the reception of information by another terminal from the base apparatus. For example, if a channel selection command is issued from terminal 30A while the power supply to terminal 30B is off and terminal 30B is not in receiving information, then the command is not a competitive command. On the other hand, if a channel changing command is issued from terminal 30A while terminals 30A and 30B are receiving the same channel from the base apparatus, then the command is a competitive command.

In the command processing method of the invention, when a command is a competitive command and therefore is not accepted, base apparatus 10 issues a notification to the terminal from which the command has been transmitted indicating that the command could not be accepted. In the terminal receiving the notification, a message such as "This command cannot be accepted." is displayed on LCD 32 or is output from speaker 33 under the control of main control section 41.

Identification information (ID) for identification of the terminal which transmits a command is added to the command transmitted from terminal 30A or 30B to base apparatus 10. Also, ID for identification of the terminal of the destination of a response to command is added to a notification transmitted from base apparatus 10 to terminal 30A or 30B.

Several detailed examples of the command processing method according to the present invention will now be described.

Figure 5:
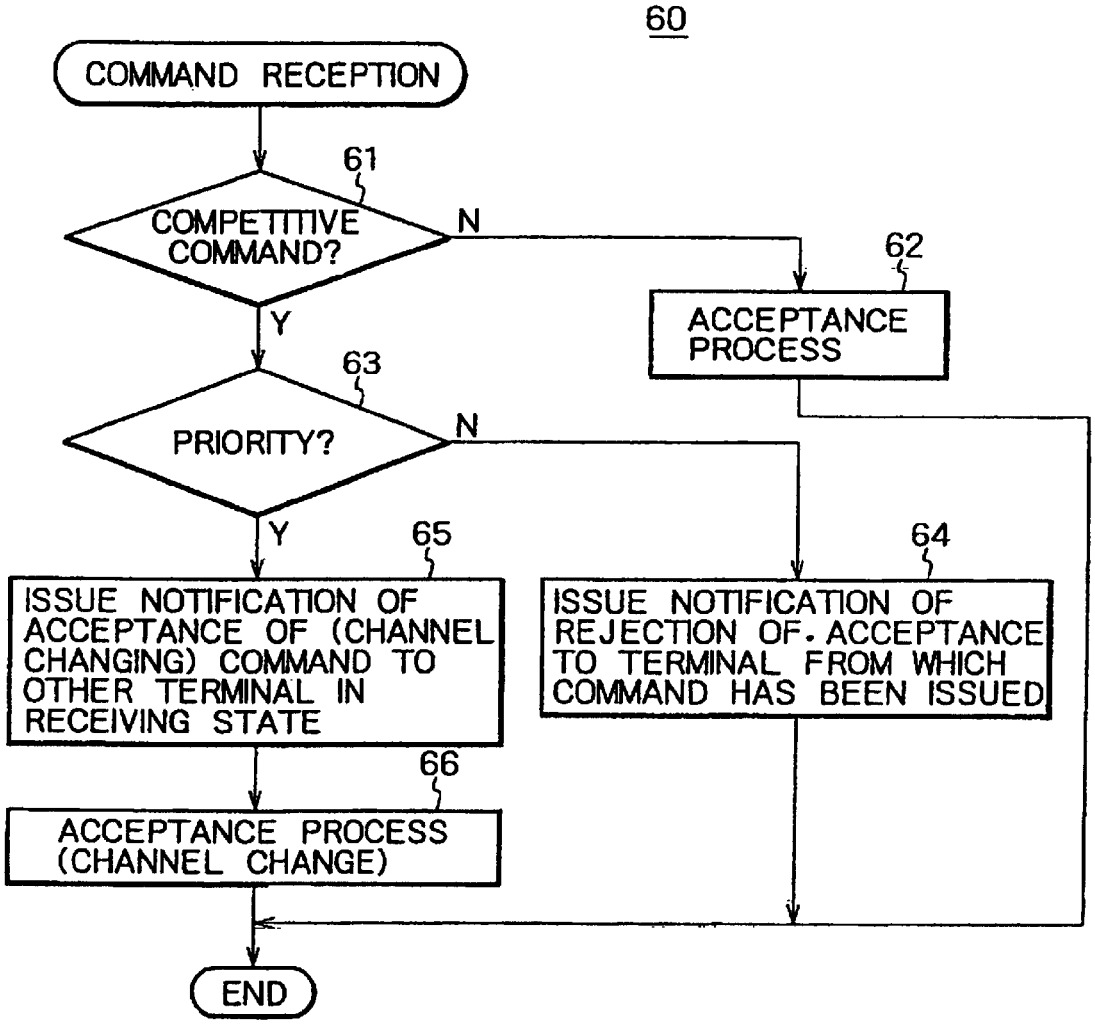
FIGS. 5 to 7 are flow charts illustrating different forms of a command processing method according to an embodiment of the invention.

Referring next to FIG. 5, a priority order is determined between terminals 30A and 30B. In other words, priority is given to one of terminals 30A and 30B.

However, the priority need not necessarily be given permanently to one of the terminals. For example, priority may be given to terminal 30A or 30B depending upon a current time. Thus, priority may be given to terminal 30A from 6:00 a.m. to 6:00 p.m. but to terminal 30B from 6:00 p.m. to 6:00 a.m. Priority may also be determined based upon the day of the week such that priority is given to terminal 30A from Monday to Friday but to terminal 30B on Saturday and Sunday. The desired priority order is set by the user in main control section 21 of base apparatus 10 through key operation section 16 of base apparatus 10.

In the first example in accordance with the invention, main control section 21 of base apparatus 10 executes a command processing routine 60 as illustrated in FIG. 5. In accordance with command processing routine 60, even if a received command is a competitive command, if the terminal which has issued the command has priority, then the command is accepted and a notification of the acceptance of the command is sent to the other receiving terminals.

In particular, referring to FIG. 5, a command is received by base apparatus 10 from one of the terminals. At step 61 it is determined whether the command is a competitive command. If it is determined that the command is not a competitive command, then processing advances from step 61 to step 62, in which main control section 21 of base apparatus 10 accepts the command. Accordingly, if no other terminal is receiving information, then the user of the terminal can change the channel freely irrespective of whether or not the user has the priority.

However, if it is determined in step 61 that the received command is a competitive command, then the processing advances from step 61 to step 63. At step 63 main control section 21 determines whether the terminal that has issued the command has priority. If it is determined that the terminal issuing the command does not have the priority, then processing advances from step 63 to step 64. At step 64 main control section 21 of base apparatus 10 rejects the command and issues a notification of the rejection of the command request to the terminal that issued the command. Accordingly, if a channel changing command is issued from terminal 30A while terminals 30A and 30B are simultaneously receiving the same channel, if terminal 30A does not have priority, then the channel changing command from terminal 30A is not accepted.

If it is determined in step 63 that the terminal that issued the command has priority, then processing advances from step 63 to step 65. At step 65 main control section 21 of base apparatus 10 accepts the command and notifies the other terminal of this acceptance. Thereafter, processing advances to step S66, in which base apparatus 10 performs the process requested in the command. Accordingly, if a channel changing command is issued from the terminal 30A while the terminals 30A and 30B are simultaneously receiving the same channel, then if terminal 30A has priority, the channel changing command from the terminal 30A is accepted. Because terminal 30B is notified in advance that the channel will be changed, the user of terminal 30B is aware of the change.

Where the priority is given to terminal 30A or 30B depending upon time or day of the week as described above, it is therefore determined in step 63 whether or not the terminal which has issued the command has priority at the present time or day of the week. Where the priority is given to the terminal 30A or 30B depending upon time or day of the week as described above, control by terminal 30A and terminal 30B can be adjusted appropriately.

Figure 6:
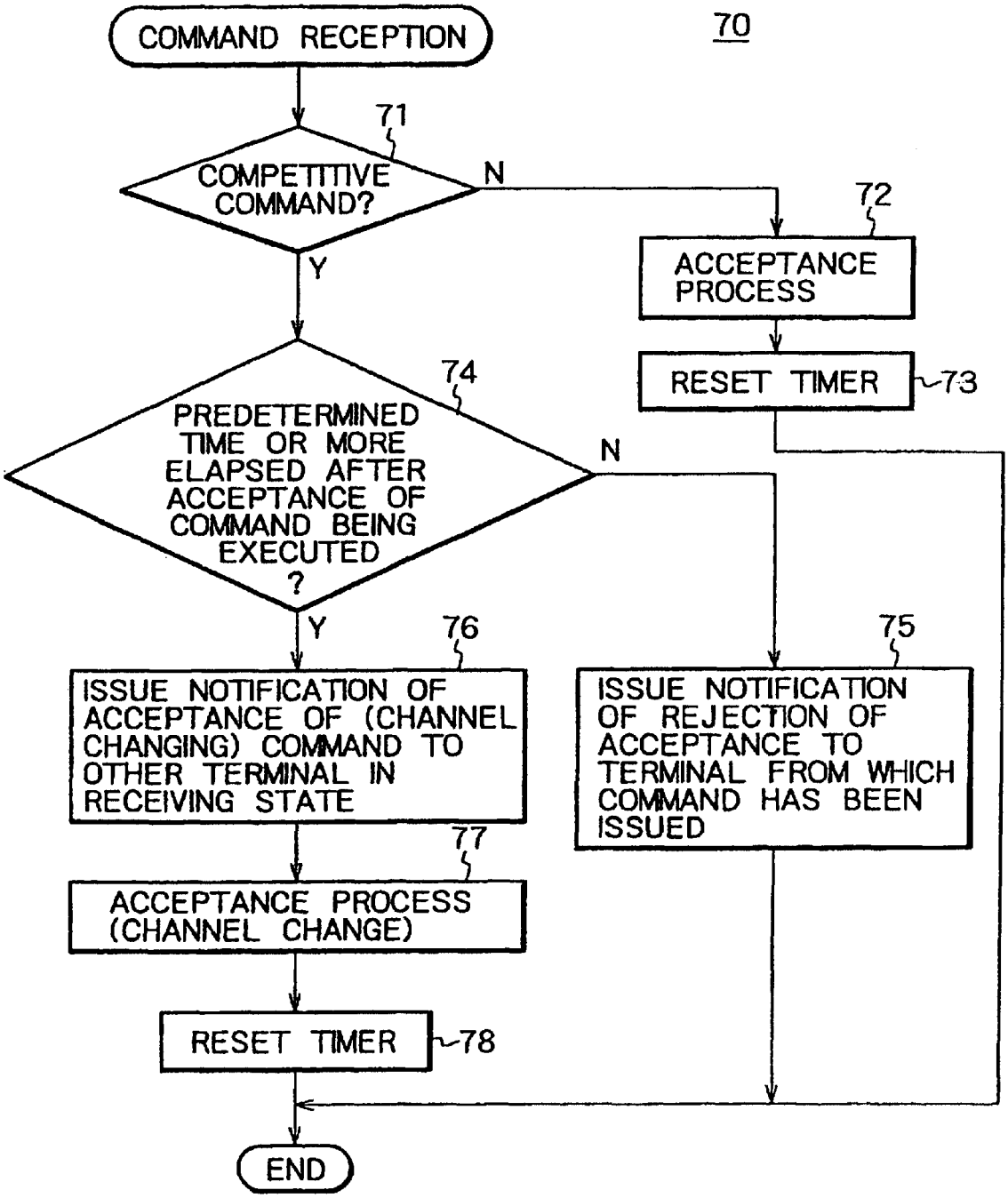

Referring next to FIG. 6, main control section 21 of base apparatus 10 executes such a command processing routine 70. In accordance with processing routine 70 if a received command is a competitive command, and the desired command is issued after a predetermined time or more after a beginning of a process being currently executed by the other terminal, then the command is accepted and the other terminal is notified. Preferably, the predetermined time represents around one to two hours.

In particular, when base apparatus 10 receives a command from one of the terminals, at step 71, main control section 21 first determines whether the command is a competitive command. If it is determined that the command is not a competitive command, then processing advances from step 71 to step 72. At step 72, main control section 21 of base apparatus 10 accepts the command. Then, processing further advances to step 73, in which main control section 21 resets a timer to update time measurement. Accordingly, when only one terminal is in a receiving state, the user of the terminal can change the channel freely. Each time the channel is changed, the timer is reset.

If it is determined at in step 71 that the command is a competitive command, then processing advances from step 71 to step 74. At step 74 main control section 21 of base apparatus 10 determines from the timer whether or not a predetermined time or more has elapsed after the acceptance of a prior command initiating the process being currently executed by the other terminal. If the predetermined time or more has not elapsed, then processing advances from step 74 to step 75. At step 75 main control section 21 of base apparatus 10 rejects the requested command and notifies the terminal which has issued the command of the rejection. Accordingly, when a terminal is receiving a certain channel, if the user of another terminal tries to select a channel different from the channel being received by the first terminal, if at least a predetermined time period has not elapsed after the acceptance of a preceding command that selected the certain channel the channel selection command from the other terminal is not accepted.

If base apparatus 10 determines in step 74 that at least a predetermined time has elapsed, then processing advances from step 74 to step 76. At step 76 main control section 21 of base apparatus 10 notifies the other terminal currently receiving data that the newly requested command will be accepted. Then, processing advances to step 77, in which main control section 21 of base apparatus 10 performs a process requested by the command. Further, in a step 78, main control section 21 resets the timer to update the time measurement. Accordingly, in the case described above, if a fixed predetermined time or more has elapsed after the acceptance of a preceding command initiating a present activity from one terminal, then channel selection command received from another terminal is accepted. The user of the one terminal is therefore notified in advance that the channel will be changed.

Figure 7:
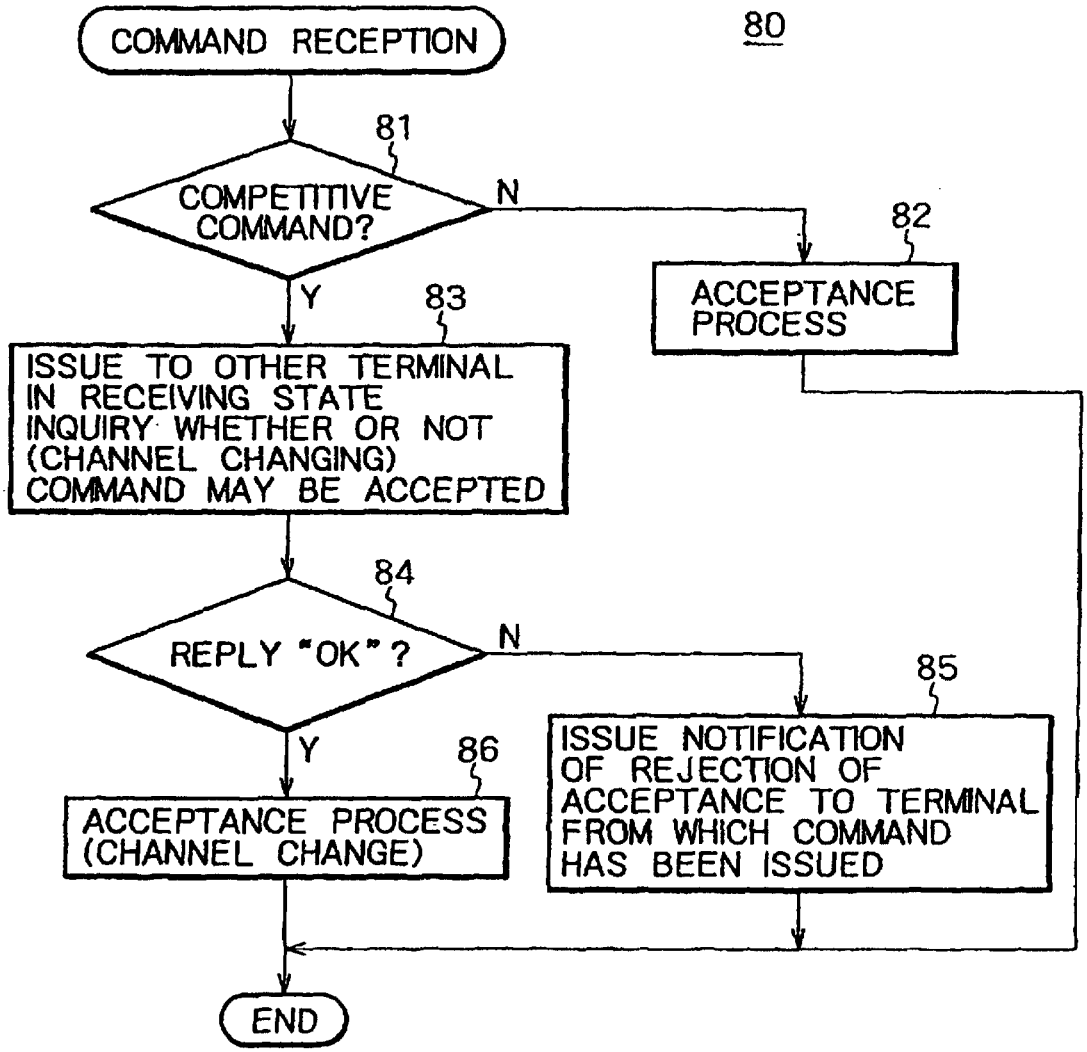

Referring next to FIG. 7, main control section 21 of base apparatus 10 executes a command processing routine 80. In accordance with this embodiment of the invention, even if a competitive command is received, if the user of the other terminal which is receiving data consents to acceptance of the command, then the command is accepted.

In command processing routine 80, base apparatus 10 first determines in step 81 whether or not a received command is a competitive command. If the command is not a competitive command, then processing advances from step 81 to step 82. At step 82, main control section 21 of base apparatus 10 accepts the command.

If it is determined in step 81 that the command is a competitive command, then processing advances from step 81 to step 83. At step 83 main control section 21 of base apparatus 10 issues to the other terminal currently receiving data an inquiry whether or not the command may be accepted. The inquiry is performed by transmitting control data from base apparatus 10 to the other terminal and displaying a message such as "May the channel be changed?" on the LCD 32, or outputting from speaker 33 on the other terminal an audio version of the question.

In response to the inquiry, the user of the other terminal operates key operation section 35 or control panel 37 to issue a reply representing whether or not the command may be accepted. Reply data is transmitted from the other terminal to the base apparatus 10.

After the inquiry in step 83, processing advances to step 84. At step 84 main control section 21 of the base apparatus 10 determines whether or not the received reply accepts the command. If the reply objects to the acceptance of the command, then processing advances from step 84 to step 85. At step 85 main control section 21 of base apparatus 10 rejects the command and notifies the terminal that issued the command of the rejection.

If the reply consents to the acceptance of the command, then processing advances from step 84 to step 86. At step 86 main control section 21 of the base apparatus 10 accepts the command and implements the requested action.

While the radio LAN system described hereinabove includes the single base apparatus 10 and the two terminals 30A and 30B, the present invention can be applied also to a radio LAN system which includes a single base apparatus and three or more terminals.

In this instance, where a priority order is set among the terminals as in the first example described hereinabove, it is possible to give priority permanently to one or more of the terminals, to permanently give different order numbers to the terminals, to give priority to one or more of the terminals depending upon the time or day of the week, or to give different priority order numbers to the terminals.

In this case with three or more terminals, base apparatus 10 determines, at step 63 of command processing routine 60 of FIG. 5, whether or not the priority of the terminal which has issued a command is higher than the priority of the other terminal or terminals that are currently receiving data. If the priority is not higher or is equal, then the command is not accepted. If the priority is higher, then the command is accepted.

Further, where the command is accepted when the user of the other terminal consents to acceptance of the command, if a plurality of other terminals are also receiving data, then the base apparatus 10 accepts the command, in step 84 of the command processing routine 80 of FIG. 7, only when the command is accepted by a majority of the plurality of terminals currently receiving data including the terminal which has issued the command. If the command is accepted, base apparatus 10 issues to those terminals that objected to the command a notification that the command will be accepted.

Further, the present invention can be applied also to a radio LAN system which is composed of a plurality of base apparatus and a plurality of terminals.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A command processing method for a radio LAN (Local Area Network) system which includes a plurality of terminals and at least one base apparatus and wherein a command issued from any of said terminals is received by said base apparatus and information is transmitted from said base apparatus to one or more of the plurality of terminals by radio communication between the terminals and said base apparatus, said method comprising the steps of:

receiving commands issued from any of said terminals, said commands comprising both competitive commands and non-competitive commands;

determining whether the received command is a competitive command whose acceptance can result in a disturbance of information reception of any other of said terminals;

rejecting acceptance of the command if it is determined that said received command is a competitive command; and issuing a notification of the rejection of the command to the terminal that has issued the command;

whereby the disturbance caused by an acceptance of a competitive command to other terminals that are under a receiving state is minimized.

2. The command processing method of claim 1, further comprising the steps of:

setting a priority order among said plurality of terminals;

if it is determined that said received command is a competitive command, determining whether said priority order of said terminal issuing said command is higher than that of any other of said terminals currently receiving data;

if it is determined that said priority order of said terminal issuing said command is higher than that of any other of said terminals currently receiving data, accepting said command; and issuing a notification of said acceptance of said command to said other terminals currently receiving data.

3. The command processing method of claim 1, further comprising the steps of:

setting a predetermined time interval;

if it is determined that said received command is a competitive command, determining whether said predetermined time interval has elapsed since the issuance of a command implementing a procedure currently in operation;

if it is determined that said predetermined time interval has elapsed, accepting said command; and issuing a notification of said acceptance of said command to said other terminals currently receiving data.

4. The command processing method of claim 1, further comprising the steps of:

inquiring of said other terminals receiving data whether a particular command may be accepted; and if a response to said inquiry from all of said other terminals consents to acceptance of said particular command, accepting said particular command.

5. A radio communication apparatus for a radio LAN (Local Area Network) system that includes a plurality of terminals and at least one base apparatus wherein a command issued from any of said terminals is received by said base apparatus and information is transmitted from said base apparatus to the terminals by radio communication between the terminals and said base apparatus, said base apparatus comprising:

reception means for receiving commands issued from any of said terminals, said commands comprising both competitive commands and non-competitive commands;

discrimination means for determining whether the received command is a competitive command whose acceptance can result in a disturbance of reception of data of any other of said terminals, and further determining, based on a result of the determination whether the received command is the competitive command, and whether or not the command should be accepted; and first transmission means for issuing, when said discrimination means determines that acceptance of the command should be rejected, a notification of the rejection of acceptance of the command to the terminal which has issued the command;

whereby the disturbance caused by an acceptance of a competitive command to other terminals that are under a receiving state is minimized.

6. The radio communication apparatus according to claim 5, further comprising:

means for setting a priority order among said plurality of terminals;

means for determining whether said priority order of said terminal issuing said command is higher than that of any other of said terminals currently receiving data if it is determined that said received command is a competitive command;

means for accepting said command if it is determined that said priority order of said terminal issuing said command is higher than that of any other of said terminals currently receiving data; and second transmission means for issuing a notification of said acceptance of said command to said other terminals currently receiving data.

7. The radio communication apparatus according to claim 5, further comprising:

means for setting a predetermined time interval;

means for determining whether said predetermined time interval has elapsed since the issuance of a command implementing a procedure currently in process if it is determined that said received command is a competitive command;

means for accepting said command if it is determined that said predetermined time interval has elapsed; and second transmission means for issuing a notification of said acceptance of said command to said other terminals currently receiving data.

8. The radio communication apparatus according to claim 5, further comprising:

means inquiring of said other terminals receiving data whether a particular command may be accepted; and means for accepting said particular command if a response to said inquiry from all of said other terminals consents to acceptance of said particular command.

*9. A command processing method for a base apparatus connecting to a plurality of terminals wherein a command issued from any of said terminals is received by said base apparatus and information is transmitted from said base apparatus to one or more of the plurality of terminals, said method comprising the steps of:*

*receiving commands issued from any of said terminals, said commands comprising both competitive commands and non-competitive commands;*

*determining whether the received command is a competitive command whose acceptance can result in a disturbance of information reception of any other of said terminals;*

*rejecting acceptance of the command if it is determined that said received command is a competitive command; and*

*issuing a notification of the rejection of the command to the terminal that has issued the command;*

*whereby the disturbance caused by an acceptance of a competitive command to other terminals that are under a receiving state is minimized.*

*10. The method of claim 9, wherein the commands issued from any of said terminals are received by radio communication between the terminals and said base apparatus.*

*11. A base apparatus connecting to a plurality of terminals wherein a command issued from any of said terminals is received by said base apparatus and information is transmitted from said base apparatus to the terminals, said base apparatus comprising:*

*reception means for receiving commands issued from any of said terminals, said commands comprising both competitive commands and non-competitive commands;*

*determining means for determining whether the received command is a competitive command whose acceptance can result in a disturbance of reception of data of any other of said terminals;*

*rejecting means for acceptance of the command if it is determined that said received command is a competitive command; and*

*transmission means for issuing, when said discrimination means determines that acceptance of the command should be rejected, a notification of the rejection of acceptance of the command to the terminal which has issued the command;*

*whereby the disturbance caused by an acceptance of a competitive command to other terminals that are under a receiving state is minimized.*

*12. The base apparatus of claim 11, wherein said command issued from any of said terminals and said information from said base apparatus are received and transmitted, respectively, by radio communication.*

*13. A base apparatus for communicating with at least a first terminal and a second terminal, each terminal operable to send a command to said base apparatus, comprising:*

*a reception section for receiving a first command from said first terminal;*

*a channel selector for selecting desired a information transmission channel in accordance with said first command received from the first terminal and for outputting video data and audio data transmitted via said selected information transmission channel;*

*a compression section for compressing said video data and audio data outputted from said channel selector;*

*a transmission section for transmitting said compressed video data and audio data to said first terminal; and*

*a control section for rejecting a second command from said second terminal when said reception section receives said second command while said transmission section is transmitting said compressed video data and audio data to said first terminal, whether said second command is a competitive command or is not a competitive command.*

*14. The base apparatus of claim 13, wherein said channel selector is a tuner.*

*15. The base apparatus of claim 13, wherein said reception section and said transmission section are coupled to an antenna.*

* * * * *